US010458345B2

(12) United States Patent
Jung et al.

(10) Patent No.: US 10,458,345 B2
(45) Date of Patent: Oct. 29, 2019

(54) APPARATUS FOR CONTROLLING GASOLINE-DIESEL COMPLEX COMBUSTION ENGINE AND METHOD FOR CONTROLLING GASOLINE-DIESEL COMPLEX COMBUSTION ENGINE

(71) Applicants: HYUNDAI MOTOR COMPANY, Seoul (KR); Seoul National University R&DB Foundation, Seoul (KR)

(72) Inventors: Hyunsung Jung, Anyang-si (KR); Yo Han Chi, Seongnam-si (KR); Kyoungdoug Min, Seoul (KR); Jeongwoo Lee, Seoul (KR); Sanghyun Chu, Seoul (KR)

(73) Assignees: HYUNDAI MOTOR COMPANY, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 211 days.

(21) Appl. No.: 15/366,888

(22) Filed: Dec. 1, 2016

(65) Prior Publication Data

US 2017/0342916 A1 Nov. 30, 2017

(30) Foreign Application Priority Data

May 24, 2016 (KR) ........................ 10-2016-0063171

(51) Int. Cl.
*F02D 19/08* (2006.01)
*F02D 41/00* (2006.01)
(Continued)

(52) U.S. Cl.
CPC ......... *F02D 19/081* (2013.01); *F02D 19/061* (2013.01); *F02D 19/0649* (2013.01);
(Continued)

(58) Field of Classification Search
CPC .. F02D 19/081; F02D 19/061; F02D 19/0649; F02D 35/023; F02D 41/0025;
(Continued)

(56) References Cited

U.S. PATENT DOCUMENTS 5,386,722 A * 2/1995 Meyer .................. G01L 23/225
73/114.06
5,887,566 A * 3/1999 Glauber ................ F02D 19/105
123/27 GE
(Continued)

FOREIGN PATENT DOCUMENTS

JP 2002364446 A 12/2002
KR 101509955 B1 4/2015

*Primary Examiner* — David Hamaoui
*Assistant Examiner* — John D Bailey
(74) *Attorney, Agent, or Firm* — Morgan, Lewis & Bockius LLP (57) ABSTRACT

An apparatus for controlling a gasoline-diesel complex combustion engine includes an engine generating driving torque by burning gasoline fuel and diesel fuel, a driving information detector for detecting driving information of the engine, and a controller for controlling a diesel injector such that diesel fuel is injected as a single injection or a split injection based on a driving region and a knock intensity included within the driving information.

10 Claims, 8 Drawing Sheets

(51) Int. Cl.
*F02D 41/04* (2006.01)
*F02D 41/40* (2006.01)
*F02D 19/06* (2006.01)
*F02D 35/02* (2006.01)

(52) U.S. Cl.
CPC ....... *F02D 35/023* (2013.01); *F02D 41/0025* (2013.01); *F02D 41/402* (2013.01); *F02D 19/0689* (2013.01); *F02D 19/0692* (2013.01); *F02D 2200/101* (2013.01); *F02D 2200/1006* (2013.01); *Y02T 10/36* (2013.01); *Y02T 10/44* (2013.01)

(58) Field of Classification Search
CPC ............... F02D 41/402; F02D 19/0689; F02D 19/0692; F02D 2200/1006; F02D 2200/101; Y02T 10/36; Y02T 10/44
USPC ....... 123/478, 434, 515, 525, 575, 435, 527; 701/103, 104
See application file for complete search history.

(56) References Cited

U.S. PATENT DOCUMENTS

| | | | | |
|---|---|---|---|---|
| 6,067,954 | A * | 5/2000 | Kudou | F02D 41/10 123/299 |
| 6,230,683 | B1 * | 5/2001 | zur Loye | F02B 1/12 123/27 GE |
| 6,276,334 | B1 * | 8/2001 | Flynn | F02B 19/14 123/435 |
| 6,286,482 | B1 * | 9/2001 | Flynn | F02B 1/12 123/25 C |
| 6,636,797 | B2 * | 10/2003 | Yoshizawa | F02B 1/12 123/299 |
| 6,651,432 | B1 * | 11/2003 | Gray, Jr. | F01N 3/035 123/305 |
| 6,912,992 | B2 * | 7/2005 | Ancimer | F02B 1/12 123/299 |
| 8,671,911 | B2 * | 3/2014 | Moren | F02B 69/04 123/305 |
| 9,909,523 | B1 * | 3/2018 | Glugla | F02B 17/005 |
| 10,018,129 | B2 * | 7/2018 | Imhof | F02D 19/061 |
| 2001/0017127 | A1 * | 8/2001 | Flynn | F02B 1/12 123/435 |
| 2001/0056322 | A1 * | 12/2001 | Yoshizawa | F02B 1/12 701/104 |
| 2002/0020388 | A1 * | 2/2002 | Wright | F02B 1/04 123/304 |
| 2003/0168037 | A1 * | 9/2003 | zur Loye | F02B 1/04 123/295 |
| 2003/0196635 | A1 * | 10/2003 | Kataoka | F02B 47/08 123/299 |
| 2007/0119417 | A1 * | 5/2007 | Eng | F01L 1/34 123/305 |
| 2010/0294236 | A1 * | 11/2010 | Surnilla | F02D 41/0025 123/304 |
| 2011/0088654 | A1 * | 4/2011 | Courtoy | F02D 19/0647 123/299 |
| 2011/0184629 | A1 * | 7/2011 | Krengel | F02D 19/061 701/103 |
| 2011/0313641 | A1 * | 12/2011 | Glugla | F02D 35/02 701/104 |
| 2013/0247875 | A1 * | 9/2013 | Jay | F02M 43/04 123/447 |
| 2013/0255628 | A1 * | 10/2013 | Moren | F02B 69/04 123/406.29 |
| 2014/0331970 | A1 * | 11/2014 | Bidner | F02D 19/0642 123/435 |
| 2015/0068506 | A1 * | 3/2015 | Gokhale | F02D 41/401 123/679 |
| 2015/0176513 | A1 * | 6/2015 | Lana | F02D 41/1439 123/406.48 |
| 2015/0369162 | A1 * | 12/2015 | Cohn | F02D 13/0215 123/406.27 |
| 2016/0298553 | A1 * | 10/2016 | Angeby | F02D 35/027 |
| 2017/0107932 | A1 * | 4/2017 | Ochi | F02D 41/402 |
| 2017/0184049 | A1 * | 6/2017 | Shirahashi | F02B 3/12 |
| 2017/0321616 | A1 * | 11/2017 | Miller | F02D 19/0615 |
| 2017/0335761 | A1 * | 11/2017 | Horsley | F02M 43/04 |

* cited by examiner

APPARATUS FOR CONTROLLING GASOLINE-DIESEL COMPLEX COMBUSTION ENGINE AND METHOD FOR CONTROLLING GASOLINE-DIESEL COMPLEX COMBUSTION ENGINE

CROSS-REFERENCE TO RELATED APPLICATION

This application claims the benefit of priority to Korean Patent Application No. 10-2016-0063171, filed with the Korean Intellectual Property Office on May 24, 2016, the entire contents of which are incorporated herein by reference.

TECHNICAL FIELD

The present disclosure relates to an apparatus and a method for controlling a gasoline-diesel complex combustion engine.

BACKGROUND

Generally, a diesel engine has excellent fuel efficiency, but exhausts materials such as nitrogen oxides (NOx) and the like. On the other hand, a gasoline engine has relatively lower fuel efficiency, but exhausts relatively fewer contaminated materials such as nitrogen oxides (NOx) and the like.

Recently, exhaust gas regulations for diesel engines have been tightened, so development of a novel diesel engine is required.

As an example of a novel diesel engine, a gasoline-diesel complex combustion engine that is driven by using a mixture of a gasoline fuel and a diesel fuel is in development.

The gasoline-diesel complex combustion engine intakes a mixture gas where the gasoline fuel and air are premixed in an intake stroke and injects the diesel fuel to control an ignition in a compression stroke. Then, the diesel fuel is compressed and ignited in an ignition stroke. At this time, the gasoline fuel is also ignited. Finally, the diesel fuel and the gasoline fuel are combusted in an explosion stroke, thereby generating driving power. However, the gasoline fuel and the diesel fuel may be ignited using a spark plug depending on a proportion of the gasoline fuel and the diesel fuel.

According to gasoline-diesel complex combustion engines of the conventional art, a single injection method has been applied when diesel fuel is injected.

However, since combustion characteristics of the gasoline-diesel complex combustion engine are different according to an engine load, fuel injection is required according to the engine load.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for controlling a gasoline-diesel complex combustion engine that can obtain combustion stability and reduce substance included in exhaust gas by differentiating fuel injection methods according to driving regions of an engine.

In an embodiment, an apparatus for controlling a gasoline-diesel complex combustion engine may include an engine generating driving torque by burning gasoline fuel and diesel fuel; a driving information detector for detecting driving information of the engine; and a controller for controlling a diesel injector such that diesel fuel is injected as a single injection or a split injection based on a driving region and a knock intensity included with the driving information.

The controller may control that the diesel fuel is injected as the single injection when the driving region is a low-speed and a high-load region, the diesel fuel is injected as the single injection when the driving region is a high-speed and a low-load or middle-load region and the knock intensity is less than a predetermined value, and the diesel fuel is injected as the split injection when the driving region is a high-speed and a low-load or a middle-load region, and the knock intensity is equal to or greater than the predetermined value.

The controller may determine a load region of the engine from a Brake Mean Effective Pressure (BMEP) and a diesel ratio, and the diesel ratio is a diesel fuel amount relative to the entire fuel amount.

The controller may calculate the knock intensity from a maximum combustion pressure, a maximum pressure rise rate and an engine speed detected by the driving information detector.

The knock intensity is calculated from an equation of $$RI = f(MPRR, RPM, P_{max}) = 2.88 \times 10^{-8} \times \frac{(MPRR \times RPM)^2}{P_{max}},$$

wherein MPRR denotes maximum pressure rise rate, RPM denotes engine speed, and Pmax denotes maximum combustion pressure.

The split injection may include a first main injection and a second main injection, the first main injection is injected at a predetermined first Before Top Dead Center Crank Angle (BTDC CA), and the second main injection is injected at a predetermined second BTDC CA, and the first BTDC CA is increased as the driving region of the engine moves from the low-load region to the middle-load region.

A method for controlling gasoline-diesel complex combustion engine according to another exemplary embodiment of the present disclosure may include, by a driving information detector, detecting a driving information of an engine; and by a controller, controlling that diesel fuel injected by a diesel injector is injected as a single injection or a split injection based on a driving region and a knock intensity derived from the driving information.

The diesel fuel may be injected as the single injection when the driving region is a low-speed and a high-load region, the diesel fuel is injected as the single injection when the driving region is a high-speed and a low-load or a middle-load region and the knock intensity is less than a predetermined value, and the diesel fuel is injected as the split injection method when the driving region is a high-speed and a low-load or a middle-load region and the knock intensity is equal to or greater than the predetermined value.

A load region of the engine may be determined from a BMEP and a diesel ratio, and the diesel ratio is a diesel fuel amount relative to the entire fuel amount.

The knock intensity may be calculated from a maximum combustion pressure, a maximum pressure rise rate and an engine speed detected by the driving information detector.

The knock intensity (RI) may be calculated from an equation of $$RI = f(MPRR, RPM, P_{max}) = 2.88 \times 10^{-8} \times \frac{(MPRR \times RPM)^2}{P_{max}},$$

wherein MPRR denotes maximum pressure rise rate, RPM denotes engine speed, and Pmax denotes maximum combustion pressure.

The split injection may include a first main injection and a second main injection, the first main injection is injected at a predetermined first BTDC CA, and the second main injection is injected at a predetermined second BTDC CA, and the first BTDC CA is increased as the driving region of the engine moves from the low-load region to the middle-load region.

According to an exemplary embodiment of the present disclosure, since an injection method of diesel fuel is differentiated according to a driving region of an engine, it is possible to obtain combustion stability and decrease material included in exhaust gas.

BRIEF DESCRIPTION OF THE DRAWINGS

Accompanying drawings are only for describing exemplary embodiments of the present disclosure and the scope of the present disclosure is not limited by the accompanying drawings.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

To clearly describe the present disclosure, parts that are irrelevant to the description are omitted, and like numerals refer to like or similar constituent elements throughout the specification.

Further, in the drawings, a size and thickness of each element may be represented for better understanding and ease of description, and the present disclosure is not limited thereto.

Hereinafter, a gasoline-diesel complex combustion engine according to an exemplary embodiment of the present disclosure will be described in detail with reference to the accompanying drawings.

Figure 1:
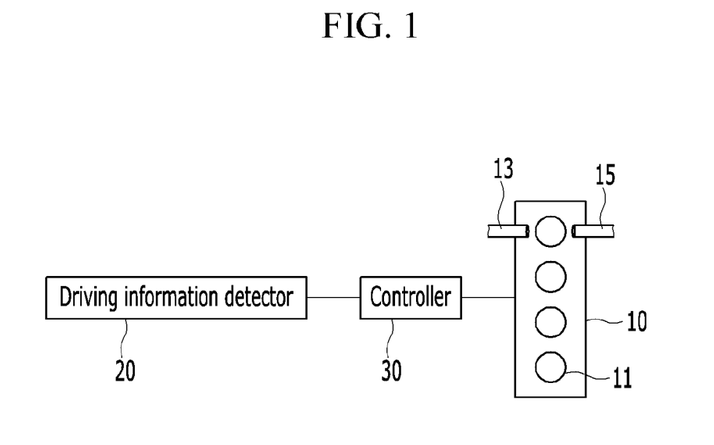
FIG. 1 is a block diagram illustrating a gasoline-diesel complex combustion engine according to an exemplary embodiment of the present disclosure.

FIG. 1 is a block diagram illustrating a gasoline-diesel complex combustion engine according to an exemplary embodiment of the present disclosure.

As shown in FIG. 1, a gasoline-diesel complex combustion engine according to an exemplary embodiment of the present disclosure includes an engine 10 including one or more combustion chambers 11 for generating driving torque by burning fuel, a diesel injector 13 for injecting diesel fuel into the combustion chamber 11, a gasoline injector 15 for injecting gasoline fuel into the combustion chamber 11, a driving information detector 20 for detecting a driving information and a controller 30 for controlling an operation of the engine 10, the diesel injector 13 and the gasoline injector 15.

The driving information detected by the driving information detector 20 may include an engine speed and a combustion pressure. The engine speed may be detected by a rotation speed of a crankshaft, and the combustion pressure may be detected by a combustion pressure sensor. That is, the driving information detector 20 may include a speed sensor of the crankshaft and the combustion pressure sensor. The driving information detected by the driving information detector 20 may be transmitted to the controller 30 electrically connected with the driving information detector 20.

The controller 30 can be realized by one or more processors activated by a predetermined program, and the predetermined program can be programmed to perform each step of a method for controlling a gasoline-diesel complex combustion engine according to an embodiment of this disclosure.

The controller 30 determines a driving region of the engine from the driving information, and calculates knock intensity (RI) from the driving information. The controller 30 controls diesel fuel injected to be injected as a single injection method or a split injection method according to the driving region and the knock intensity of the engine.

The driving region may include a speed region and a load region. The controller 30 may determine the speed region of the engine from the engine speed. The controller 30 may determine the speed region to a low-speed region when the engine speed is less than a predetermined speed, and may determine the speed region to a high-speed region when the engine speed is greater than the predetermined speed or the same.

The controller 30 can determine the load region from a BMEP (brake mean effective pressure) and a diesel ratio. The diesel ratio may mean a diesel fuel amount of the entire fuel amount injected into the combustion chamber 11.

The controller 30 may determine that the driving region is a low/middle-load region when the BMEP is less than a predetermined pressure (e.g., 4 bar) and the diesel ratio is less than a predetermined ratio (e.g., 50%), and that the driving region is a high-load region when the BMEP is greater than the predetermined pressure and the diesel ratio is greater than the predetermined ratio.

In the gasoline-diesel complex combustion engine, diesel fuel is used as an ignition soured and gasoline fuel is used for controlling torque of the engine. Therefore, that the ratio of the gasoline in the entire fuel (gasoline fuel+diesel fuel) is high means that the driving region is high-load region.

In an exemplary embodiment of the present disclosure, the knock intensity (RI) is used in order to predict knocking in the combustion chamber 11. The knock intensity (RI) may be calculated from a maximum combustion pressure (Pmax) of the engine 10, a maximum pressure rise rate (MPRR) (bar/deg) and the engine speed (RPM: revolution per minute).

In detail, the knock intensity may be calculated from following equation.

$$RI = f(MPRR, RPM, P_{max}) = 2.88 \times 10^{-8} \times \frac{(MPRR \times RPM)^2}{P_{max}} \quad \text{(Equation 1)}$$

Here, the MPRR denotes the maximum pressure rise rate, the RPM denotes the engine speed and the Pmax denotes the maximum combustion pressure.

A possibility that knocking will occur is low when the knock intensity is low, thus the controller 30 controls that the diesel fuel is injected as a single injection method. However, the possibility that knocking is occurred is higher when the knock intensity is high, thus the controller 30 controls that the diesel fuel is injected as the split injection method.

Hereinafter, a method for controlling the gasoline-diesel complex combustion engine according to an exemplary embodiment of the present disclosure will be described in detail with reference to accompanying drawings.

Figure 2:
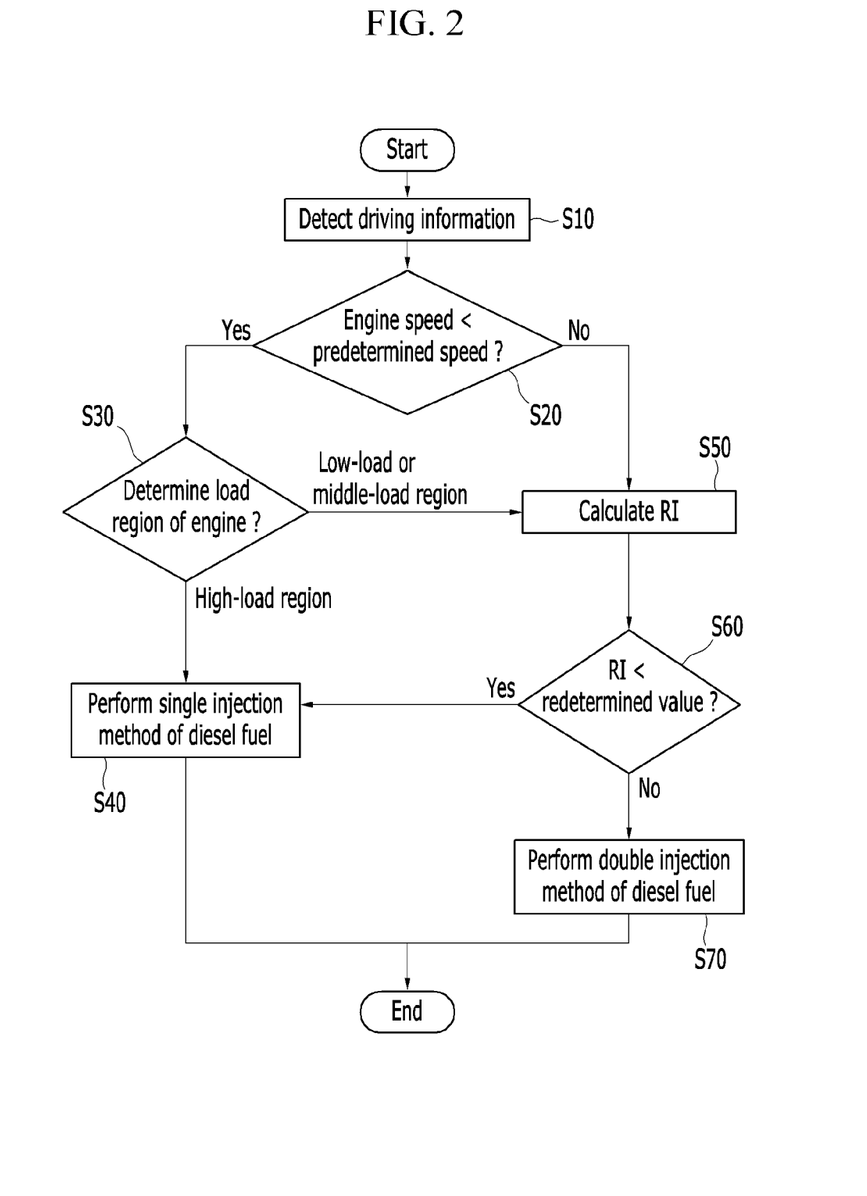
FIG. 2 is a flowchart illustrating a method for controlling a gasoline-diesel complex combustion engine according to an exemplary embodiment of the present disclosure.

FIG. 2 is a flowchart illustrating a method for controlling a gasoline-diesel complex combustion engine according to an exemplary embodiment of the present disclosure.

As shown in FIG. 2, the driving information detector 20 detects the driving information including the engine speed and the combustion pressure, and the detected driving information is transmitted to the controller 30 at step S10.

The controller 30 determines a driving region of the engine from the driving information.

In detail, the controller 30 determines a speed region of the engine at step S20. The controller 30 compares the engine speed to a predetermined speed, and determines that the speed region is a low-speed region when the engine speed is less than a predetermined speed.

The controller 30 determines a load region of the engine at step S30. The controller 30 compares the BMEP to a predetermined pressure, and compares the diesel ratio to a predetermined ratio. When the BMEP is less than the predetermined pressure and the diesel ratio is less than the predetermined ratio, the controller 30 determines that the load region of the engine is a high-load region.

When the driving region of the engine is the low-speed region and the high-load region, the controller 30 controls the diesel fuel to be injected as the single injection method at step S40.

The below Table 1 shows an emission amount according to the single injection and the split injection at the low-speed region and the high-load region.

TABLE 1

|  | Single injection | Split injection |
| --- | --- | --- |
| NOx [ppm] | 35 | 35 |
| PM [FSN] | 0.09 | 0.10 |
| CO [ppm] | 7500 | 3662 |
| THC [ppm] | 4403 | 4182 |
| CO2 [g/kWh] | 199.9 | 194.1 |

As shown in Table 1, only carbon monoxide (CO) is decreased when the diesel fuel is injected in the duel injection method in the low-speed and high-load region as compared to the single injection method. And nitrogen oxide (NOx), particulate material (PM), total hydro-carbon and carbon dioxide (CO2) are similar.

Therefore, it is preferable that the diesel fuel is injected in the single injection method.

At the step S20, the controller 30 determines that the speed region of the driving region is a high-speed region when the engine speed is greater than the predetermined speed. At the step S30, when the BMEP is greater than the predetermined pressure and the diesel ratio is greater than the predetermined ratio, the controller 30 determines that the load region of the engine is a low/middle-load region The controller 30 calculates the knock intensity (RI) when the driving region of the engine is the high-speed region and the low/middle-load region at step S50. The knock intensity is used for predicting a possibility of knocking in the combustion chamber 11, the detailed calculation method of the knock intensity is the same as the above description.

The controller 30 compares the knock intensity to a predetermined intensity (e.g., 5 MW/m²) at step S60, the controller 30 determines that the possibility of knocking in the combustion chamber 11 is very low and controls that the diesel fuel injected by the diesel injector is injected in the single injection method when the knock intensity is less than the predetermined intensity at step S40.

At the step S60, when the knock intensity is greater than the predetermined intensity, the controller 30 determines that the possibility of knocking in the combustion chamber 11 is higher and controls that the diesel fuel injected by the diesel injector is injected in the split injection method at step S70

The following Table 2 shows an emission according to the single injection and the split injection at the high-speed region and the low-load region.

TABLE 2

|  | Single injection | Split injection |
| --- | --- | --- |
| NOx [ppm] | 29 | 36 |
| PM [FSN] | 0.02 | 0.10 |
| CO [ppm] | 7600 | 4675 |
| THC [ppm] | 3420 | 2139 |
| CO2 [g/kWh] | 207.1 | 206.2 |

As shown in Table 2, when the diesel fuel is injected in the split injection method in a high-speed and low-load region, nitrogen oxide (NOx) is increased, but particulate material (PM), carbon monoxide (CO), total hydro-carbon (THC) and carbon dioxide (CO2) are decreased.

The following Table 3 shows an emission according to the single injection and the split injection at the high-speed region and the middle-load region.

TABLE 3

|  | Single injection | Split injection |
| --- | --- | --- |
| NOx [ppm] | 25 | 24 |
| PM [FSN] | 0.10 | 0.08 |
| CO [ppm] | 6800 | 3900 |
| THC [ppm] | 4502 | 4512 |
| CO2 [g/kWh] | 218.7 | 215.1 |

As shown in Table 3, when the diesel fuel is injected in the split injection method in high-speed and middle-load region, nitrogen oxide (NOx), particulate material (PM), carbon monoxide (CO), total hydro-carbon (THC) and carbon dioxide (CO2) are decreased.

Hereinafter, operations of the gasoline-diesel complex combustion engine according to embodiments the present disclosure will be described in detail with reference to accompanying drawings.

Figure 7:
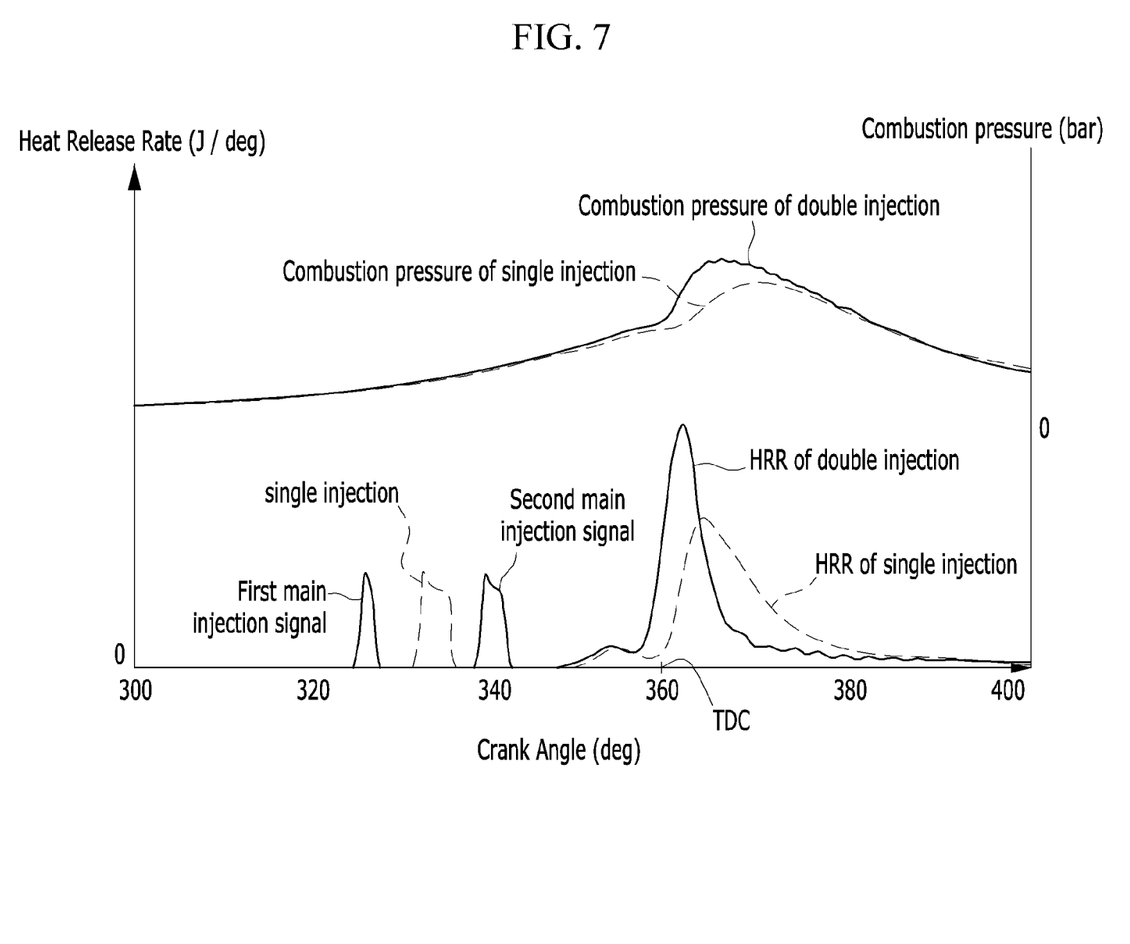
FIG. 7 is a graph illustrating an injection timing, a Heat Release Rate (HRR) and a combustion pressure according to a crank angle in a low-load region, according to embodiments of the present disclosure.
Figure 8:
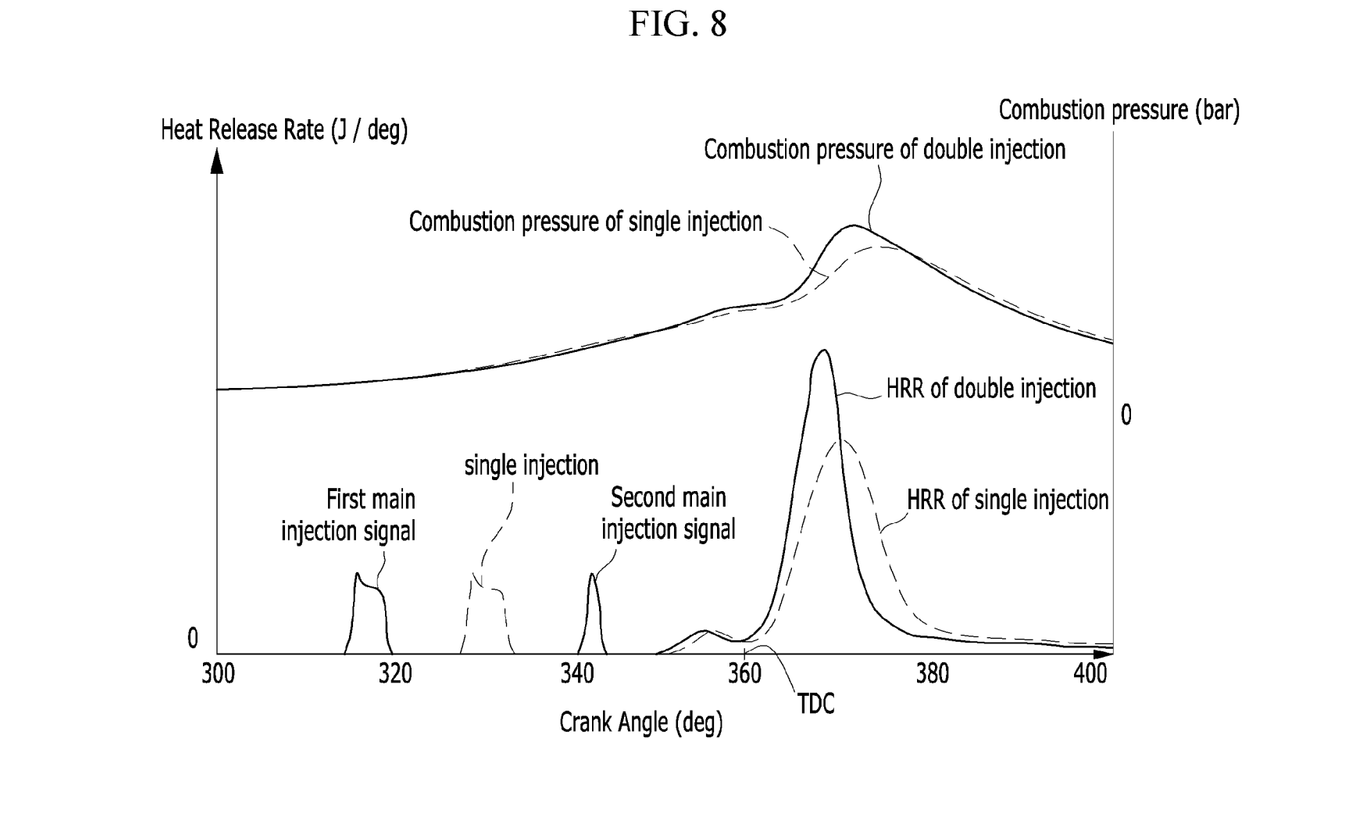
FIG. 8 is a graph illustrating an injection timing, an HRR and a combustion pressure according to a crank angle in a middle-load region, according to embodiments of the present disclosure.

FIG. 3 to FIG. 6 are drawings illustrating operations of a gasoline-diesel complex combustion engine according to exemplary embodiments of the present disclosure. FIG. 7 is a graph illustrating an injection timing, a Heat Release Rate (HRR) and a combustion pressure according to a crank angle in a low-load region, according to embodiments of the present disclosure. FIG. 8 is a graph illustrating an injection timing, a HRR and a combustion pressure according to a crank angle in a middle-load region, according to embodiments of the present disclosure.

Figure 3:
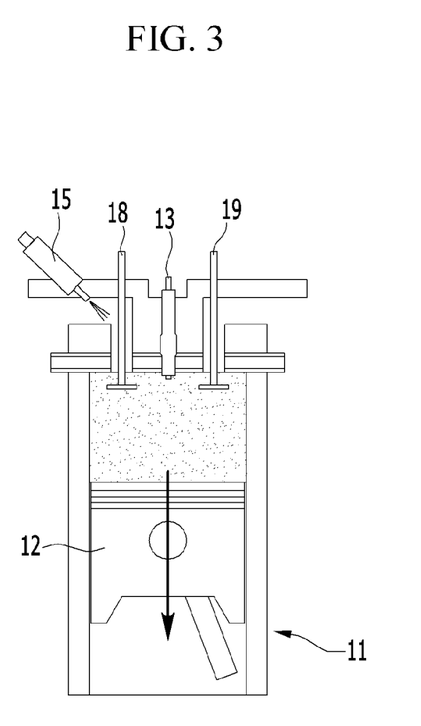
FIG. 3 to FIG. 6 are drawings illustrating operations of a gasoline-diesel complex combustion engine according to an exemplary embodiment of the present disclosure.

Referring to FIG. 3, the intake valve 18 opens the intake ports to inject a premixture of the air that is introduced through the intake manifold and the gasoline fuel that is injected through the gasoline injector 15 into the combustion chamber in the intake stroke.

And the injection timing of gasoline fuel is set to about 180 BTDC CA (before top dead center crank angle).

Figure 4:
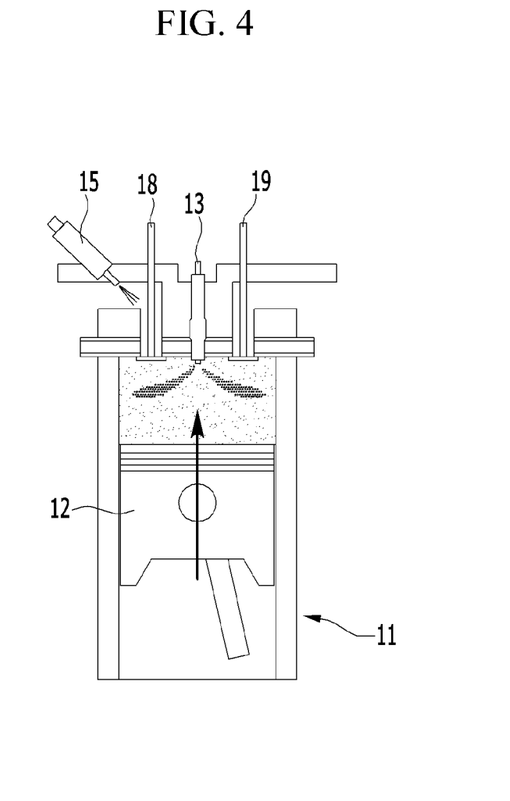

Referring to FIG. 4, when a piston is upwardly moved in the compression stroke, the piston compresses the premixture of the air and the gasoline fuel, and the diesel fuel is injected into the combustion chamber through the diesel injector 13. Diesel fuel injected by the diesel injector may be used for controlling ignition of gasoline fuel.

At this time, a first main injection of split injection of diesel fuel is injected at a predetermined first BTDC CA (before top dead center crank angle) and a second main injection of split injection of diesel fuel is injected at a predetermined second BTDC CA. Since the first BTDC CA is greater than the second BTDC CA, the first main injection is injected and then the second main injection is injected.

The first main injection may be injected at 45±3 BTDC CA and the second main injection may be injected at 20±3 BTDC CA.

When the diesel fuel is injected as the single injection method, the diesel fuel may be injected at 30±3 BTDC CA.

The first main injection amount and the second main injection amount may be different according to an engine load. The first main injection amount and the second main injection amount may be stored in the controller 30 as, or in, a map data format.

For example, the second main injection amount may be decreased as the BMEP becomes larger.

Figure 5:
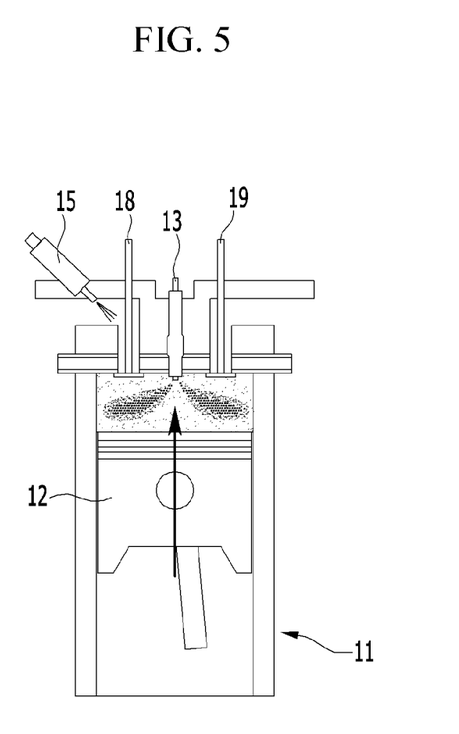

Referring to FIG. 5, an ignition occurs by compressing the diesel fuel injected according to the upward movement of the piston. The ignition may occur by the spark plugs 140 if necessary.

Figure 6:
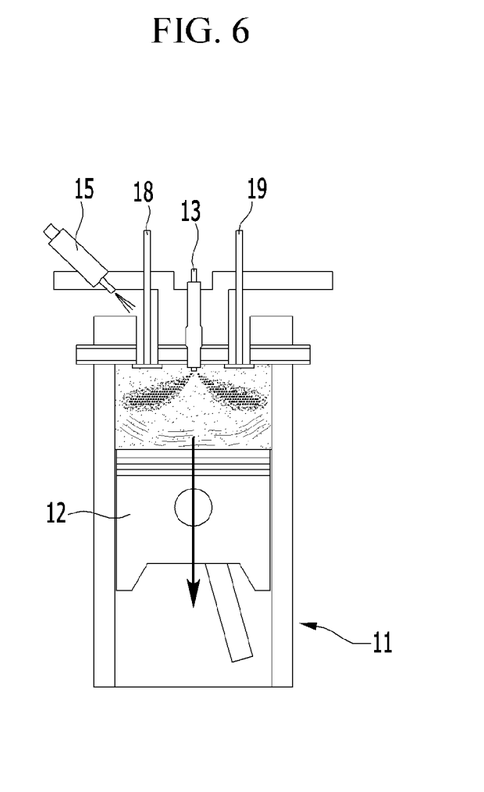

Referring to FIG. 6, the fuel mixture explodes by igniting the total fuel that is obtained by mixing the gasoline fuel and the diesel fuel, and the piston moves downward by a force of the explosion to generate the driving power, and torque. Then, the exhaust valves are opened to exhaust the exhaust gas generated in the combustion operation to the exhaust manifold through the exhaust ports.

As shown in FIG. 7 and FIG. 8, when the diesel fuel is injected in the split injection method, combustion pressure and HRR are increased, and maximum combustion pressure and maximum HRR approach TDC (top dead center).

That is, since diesel fuel and gasoline fuel are premixed by the first main injection of the diesel fuel and the diesel fuel operated as an ignition source is evenly distributed in the combustion chamber 11, a combustion speed of the gasoline fuel becomes faster. Therefore, the combustion pressure and HRR are increased and approach TDC.

As such, when the combustion pressure and the maximum HRR approach TDC, an effective work of the engine is increased, and thus engine efficiency is improved.

In the present disclosure, the split injection method differs from a pilot injection injected before a main injection performed by conventional a diesel engine. When the pilot injection is performed according to convention diesel engine, a pilot injection amount is very small. In general, the pilot injection amount is less than 10% of the main injection amount. And the main injection of conventional diesel engine is injected near the TDC (top dead center). But, according to the split injection method, the main injection is injected in two main injections (first main injection and second main injection). And a difference of the first main injection amount and the second main injection amount is very small.

As described above, according to an exemplary embodiment of the present disclosure, since main injection of diesel fuel is injected in two main injections according to the driving region and the knock intensity of the engine, it is possible to improve emissions and increase combustion efficiency.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for controlling a gasoline-diesel complex combustion engine, comprising:
   an engine generating driving torque by burning gasoline fuel and diesel fuel;
   a driving information detector for detecting driving information of the engine; and
   a controller for controlling a diesel injector such that diesel fuel is selectively injected as a single injection and a split injection based on a driving region and a knock intensity included within the driving information after gasoline fuel is injected,
   wherein the split injection includes a first main injection and a second main injection,
   wherein the first main injection is injected at a predetermined first Before Top Dead Center Crank Angle (BTDC CA), and the second main injection is injected at a predetermined second BTDC CA, and
   wherein the first BTDC CA increases as the driving region of the engine moves from a low-load region to a middle-load region.

2. The apparatus of claim 1, wherein the controller controls:
   the diesel fuel is injected as the single injection when the driving region is a low-speed region and a high-load region,
   the diesel fuel is injected, as the single injection when the driving region is a high-speed region and the low-load or middle-load region and the knock intensity is less than a predetermined value, and
   the diesel fuel is injected as the split injection when the driving region is the high-speed region and either the low-load or middle-load region, and the knock intensity is equal to or greater than the predetermined value.

3. The apparatus of claim 1, wherein the controller determines a load region of the engine from a Brake Mean Effective Pressure (BMEP) and a diesel ratio, and the diesel ratio is a diesel fuel amount relative to the entire fuel amount.

4. The apparatus of claim 1, wherein the controller calculates the knock intensity from a maximum combustion pressure, a maximum pressure rise rate and an engine speed detected by the driving information detector.

5. The apparatus of claim 4, wherein the knock'intensity is calculated from an equation of:

$$RI = f(MPRR, RPM, P_{max}) = 2.88 \times 10^{-8} \times \frac{(MPRR \times RPM)^2}{P_{max}},$$

wherein MPRR denotes maximum pressure rise rate, RPM denotes engine speed, and Pmax denotes maximum combustion pressure.

6. A method for controlling gasoline-diesel complex combustion engine comprising:
by a driving information detector, detecting a driving information of an engine; and
by a controller, controlling that diesel fuel injected by a diesel injector is selectively injected as a single injection and a split injection based on a driving region and a knock intensity derived from the driving information after gasoline fuel is injected,
wherein the split injection includes a first main injection and a second main injection,
wherein the first main injection is injected at a predetermined first BTDC CA, and the second main injection is injected at a predetermined second BTDC CA, and
wherein the first BTDC CA increases as the driving region of the engine moves from a low-load region to a middle-load region.

7. The method of claim 6, wherein the diesel fuel is injected as the single injection when the driving region is a low-speed region and a high-load region,
the diesel fuel is injected as the single injection when the driving region is a high-speed region and the low-load or middle-load region and the knock intensity is less than a predetermined value, and
the diesel fuel is injected as the split injection when the driving region is the high-speed region and the low-load or middle-load region and the knock intensity is equal to or greater than the predetermined value.

8. The method of claim 6, wherein a load region of the engine is determined from a BMEP and a diesel ratio, and the diesel ratio is a diesel fuel amount relative to the entire fuel amount.

9. The method of claim 6, wherein the knock intensity is calculated from a maximum combustion pressure, a maximum pressure rise rate and an engine speed detected by the driving information detector.

10. The method of claim 9, wherein the knock intensity is calculated from an equation of:

$$RI = f(MPRR, RPM, P_{max}) = 2.88 \times 10^{-8} \times \frac{(MPRR \times RPM)^2}{P_{max}},$$

wherein MPRR denotes maximum pressure rise rate, RPM denotes engine speed, and Pmax denotes maximum combustion pressure.

* * * * *